(12) United States Patent
McLean

(10) Patent No.: US 7,168,282 B2
(45) Date of Patent: Jan. 30, 2007

(54) METHOD AND APPARATUS FOR MANUFACTURE OF A FORGED RACK

(75) Inventor: Lyle John McLean, Oakville (AU)

(73) Assignee: Bishop Innovation Limited, North Ryde (AU)

( * ) Notice: Subject to any disclaimer, the term of this patent is extended or adjusted under 35 U.S.C. 154(b) by 182 days.

(21) Appl. No.: 10/472,464

(22) PCT Filed: Mar. 21, 2002

(86) PCT No.: PCT/AU02/00331

§ 371 (c)(1),
(2), (4) Date: May 10, 2004

(87) PCT Pub. No.: WO02/076653

PCT Pub. Date: Oct. 3, 2002

(65) Prior Publication Data

US 2004/0182125 A1    Sep. 23, 2004

(30) Foreign Application Priority Data

Mar. 22, 2001  (AU) .................................... PR3913
Apr. 11, 2001  (AU) .................................... PR4340

(51) Int. Cl.
*B21J 5/12* (2006.01)

(52) U.S. Cl. ........................... 72/356; 72/361; 72/420; 27/893.34

(58) Field of Classification Search ............... 72/342.1, 72/342.94, 357, 360, 361, 31.03, 356, 370.21, 72/370.04, 420; 29/893.34; 74/424.6
See application file for complete search history.

(56) References Cited

U.S. PATENT DOCUMENTS

| 4,116,085 | A | 9/1978 | Bishop |
| 4,491,451 | A | 1/1985 | Willim |
| 4,571,982 | A | 2/1986 | Bishop et al. |
| 4,715,210 | A | 12/1987 | Bishop et al. |
| 4,785,901 | A | 11/1988 | Maeda |
| 5,862,701 | A | 1/1999 | Bishop et al. |
| 6,782,772 | B2 * | 8/2004 | Tsubouchi et al. ............ 74/422 |

FOREIGN PATENT DOCUMENTS

| JP | 2000-247244 | * | 9/2000 |
| JP | 2000-247244 | A | 9/2000 |
| JP | 2002-154442 | * | 5/2002 |
| JP | 2002-154442 | A | 5/2002 |

* cited by examiner

*Primary Examiner*—Derris H. Banks
*Assistant Examiner*—Debra Wolfe
(74) *Attorney, Agent, or Firm*—Birch, Stewart, Kolasch & Birch, LLP

(57) ABSTRACT

A method of manufacturing a steering rack bar (6) by forging, the method comprising the steps of pacing a heated cylindrical rack bar (6) in a first forging die (15) and forging a first toothed protion (37) at one end thereof; removing the rack bar; heating the rack bar at or near the other end of said rack; and placing the other end of the rack bar in a second forging die and forging a second toothed portion (39) wherein, prior to forging the second toothed portion, the rack bar is axially and angularly aligned to a predetermined axial location and angularly orientated utilising the first toothed portion or features at or near the one end of the rack bar as a datum, and placed and held in the predetermined axial location and angular orientation prior to forging of the second toothed portion.

12 Claims, 9 Drawing Sheets

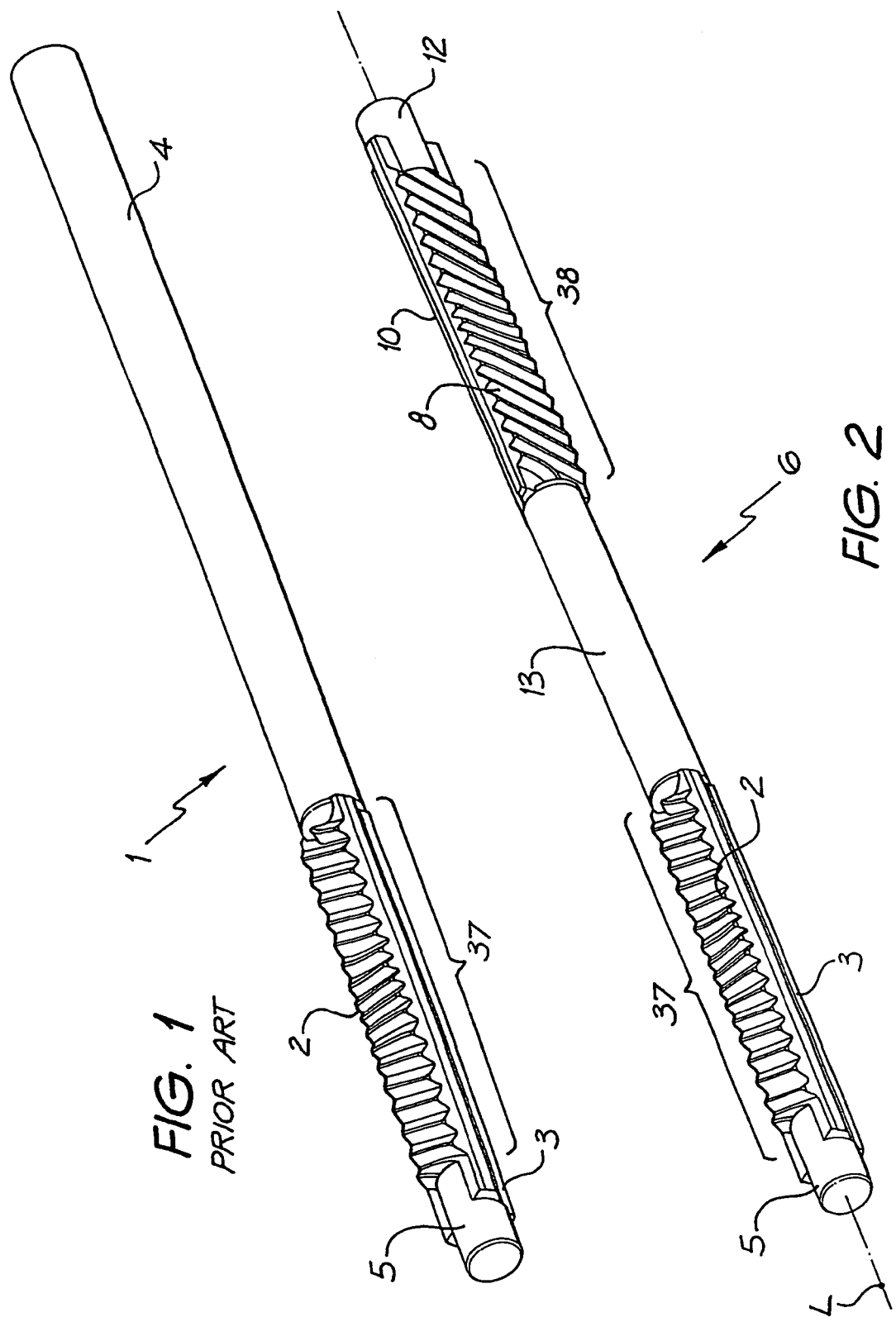

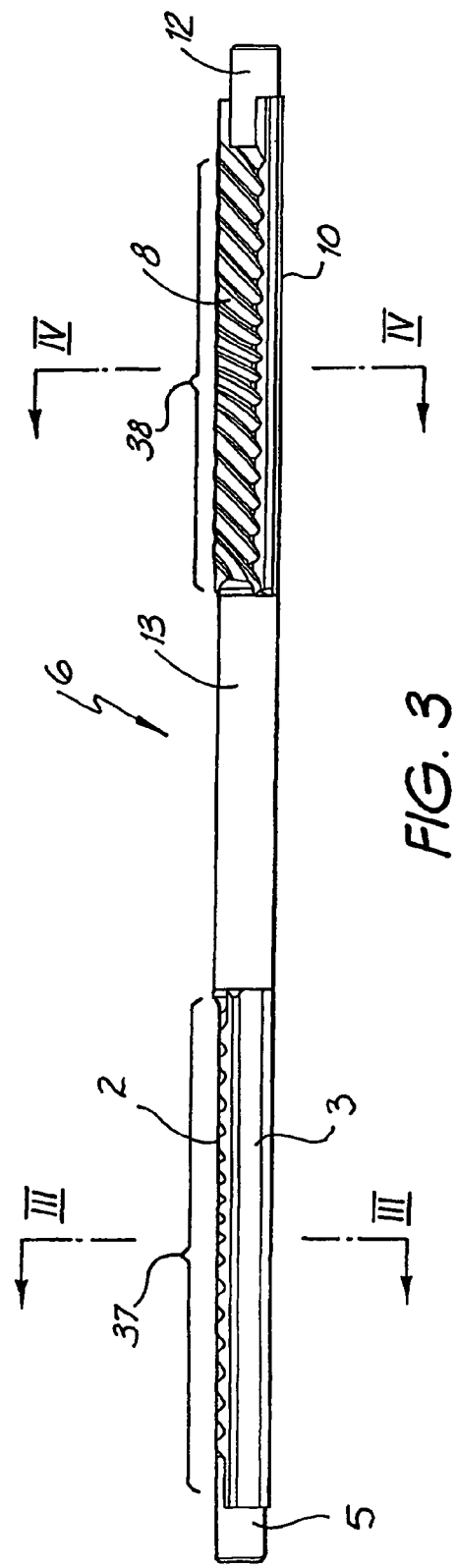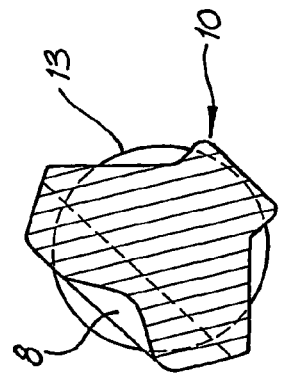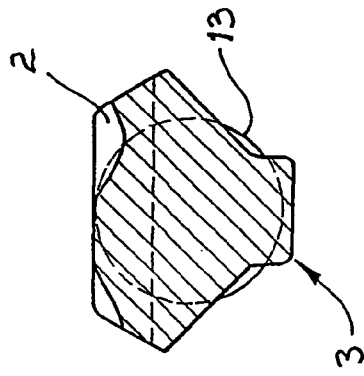
FIG. 3
FIG. 5
FIG. 4

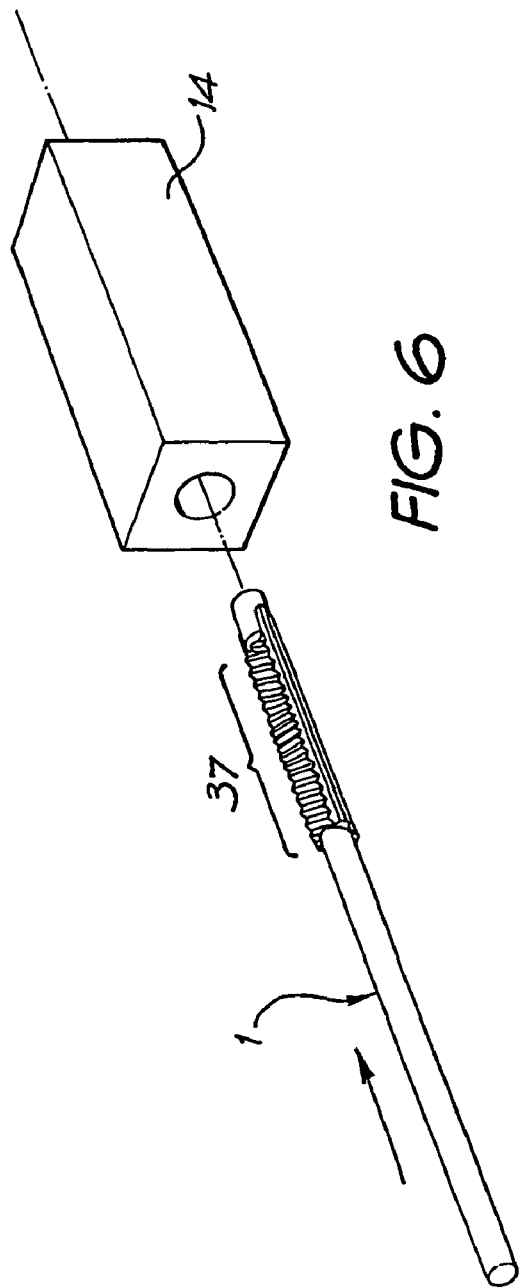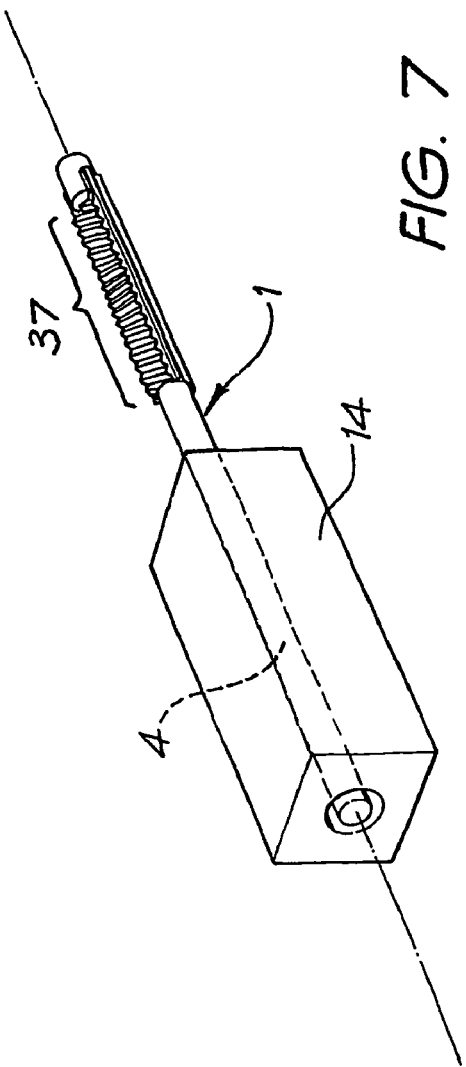

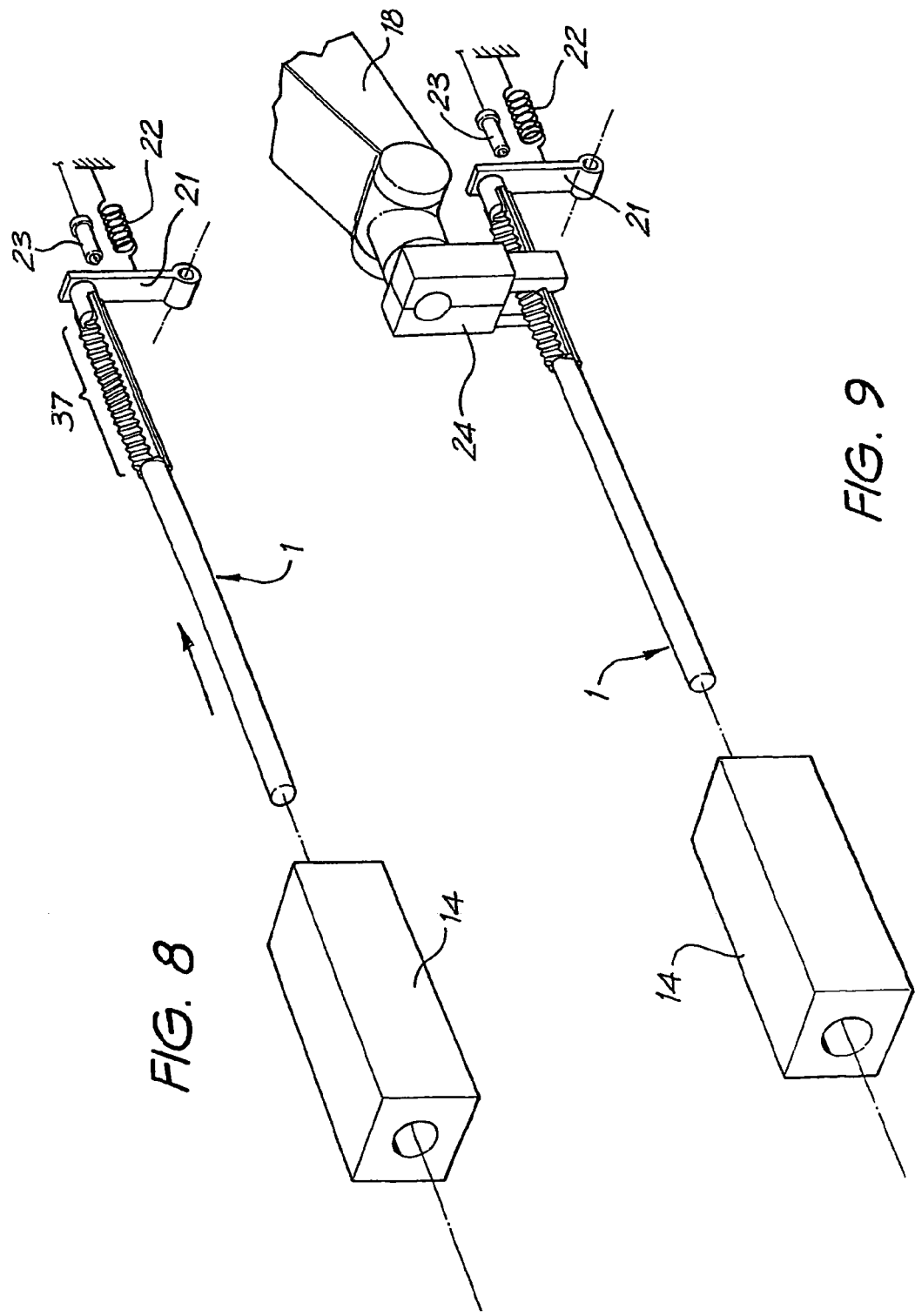

METHOD AND APPARATUS FOR MANUFACTURE OF A FORGED RACK

This application is the national phase under 35 U.S.C. §371 of PCT International Application No. PCT/AU02/00331 which has an International filing date of Mar. 21, 2002, which designated the United States of America.

TECHNICAL FIELD

The invention relates to a method and apparatus for manufacturing a steering rack for a rack and pinion steering gear wherein the steering rack has two spaced-apart toothed portions.

BACKGROUND

A steering rack having two spaced apart toothed portions for use in motor vehicle electric power steering systems is known. A first toothed portion meshes with a pinion that is axially connected to the steering wheel of the motor vehicle whilst the second toothed portion meshes with a pinion that is connected to an electric motor. Such a steering rack is hereinafter referred to as a "dual pinion rack". The first pinion may be axially connected to the steering wheel of the vehicle via a torque sensor. The torque so sensed is used to modulate the torque applied to the steering rack via the second pinion, thereby providing power assisted steering.

The majority of vehicle electric power steering systems in use today are column assist. The motor drive torque is imparted to the steering gear input shaft via a geared drive and the full driving torque required to steer the vehicle is delivered to the toothed portion of the steering rack via the pinion which is axially connected to the input shaft. The motor consumes space in the passenger cabin and can be an unwanted source of noise and heat. Hence there is increasing interest in design solutions that remove the electric motor from the vehicle cabin. The dual pinion rack earlier described is one such solution.

The known method of manufacturing dual pinion racks is to machine both the first and second toothed portions onto the rack bar.

There are disadvantages associated with machining toothed portions onto a rack bar, one of which is the wastage of material. Also, machining of toothed portions is not suitable for producing variable ratio tooth forms on rack bars and is therefore limited to constant ratio tooth forms.

However, forging methods similar to those described in U.S. Pat. No. 4,116,085 (Bishop et. al), U.S. Pat. No. 4,715,210 (Bishop et al,) U.S. Pat. No. 4,571,982 (Bishop et al) and U.S. Pat. No. 5,862,701 (Bishop at al) are suitable for forging both variable-ratio and constant ratio tooth forms. Certain advantages associated with forging racks are stated in these patents.

It has been considered to manufacture a first toothed portion on a dual pinion rack using these known forging methods, and subsequently manufacture the second toothed portion by a machining process. However, a drawback still remains that the machined toothed portion wastes material and is limited to constant ratio tooth forms.

Manufacture of variable and constant ratio steering gears by the methods and apparatus described in the aforementioned patents is well established with the majority of applications being in hydraulically powered steering gears. However, commensurate with the trend to electric power steering, forged variable ratio steering racks are being increasingly used. In addition to being able to choose an optimum on-centre ratio for good dynamic response, the designer may also choose to vary the mechanical ratio near the full lock part of the rack travel to provide an increased mechanical advantage for the electric motor.

The present invention provides a method that allows both the first and second toothed portions of a dual pinion rack to be manufactured by forging.

The present invention provides an apparatus which allows for the second toothed portion of a dual pinion rack to be manufactured by forging, and more particularly both the first and second toothed portions of a dual pinion rack to be manufactured by forging.

SUMMARY OF INVENTION

In one aspect the present invention consists in a method of manufacturing a steering rack bar by forging, said method comprising the steps of:
 (i) placing a heated cylindrical rack bar in a first forging die and forging a first toothed portion at one end thereof;
 (ii) removing said rack bar;
 (iii) heating said rack bar at or near the other end of said rack; and
 (iv) placing said other end of said rack bar in a second forging die and forging a second toothed portion wherein, prior to forging said second toothed portion, the rack bar is axially and angularly aligned to a predetermined axial location and angularly orientated utilising said first toothed portion or features at or near said one end of said rack bar as a datum, and placed and held in said predetermined axial location and angular orientation prior to forging of said second toothed portion.

Preferably said first toothed portion is cooled, hardened and tempered after step (ii) and before step (iii).

Preferably in a further step after step (iv), the angular orientation of said first toothed portion relative to said second toothed portion is measured.

Preferably in a further step if said angular orientation of said first toothed portion relative to said second toothed portion is outside a predetermined tolerance, a torsional deformation is imparted to said rack such that said angular orientation of said first toothed portion relative to said second toothed portion is controlled within said predetermined tolerance.

Preferably in one embodiment at least one of said first and second toothed portions has a Y-form cross-section. Preferably at least one of said first and second toothed portions has a variable ratio form.

Preferably in another embodiment at least one of said first and second toothed portions has a constant ratio form.

Preferably the teeth of said second toothed portion are oriented angularly about the longitudinal axis of the rack relative to the teeth of said first toothed portion.

In a second aspect the present invention is an apparatus for forging a second toothed portion onto a steering rack bar having a first toothed portion at or near one end, said apparatus comprising, grip means for gripping said rack bar in a predetermined axial location and angular orientation utilising said first toothed portion or features at or near said one end as a datum, transportation means for transporting said gripped rack bar and placing the other end of said rack into a forging die, and orientation maintaining means to hold said rack bar in said predetermined axial location and angular orientation prior to said forging die forging said second toothed portion.

Preferably said grip means and said transportation means are both components of a multi-axis robot.

Preferably said orientation maintaining means comprises a magnetic cradle.

Preferably said magnetic cradle is resiliently mounted to the lower die tooling of said forging die.

In a third aspect the present invention is a forged steering rack comprising at least two axially spaced-apart tooth portions.

Preferably at least one of said toothed portions has a Y-form cross-section.

Preferably in one embodiment at least one of said toothed portions has a variable ratio form.

Preferably in another embodiment at least one of said toothed portions has a constant ratio form.

Preferably the teeth of one of said toothed portions are oriented angularly about the longitudinal axis of the rack relative to the teeth of the other toothed portion.

BRIEF DESCRIPTION OF DRAWINGS

FIG. 1 is a perspective view of a prior art steering rack having variable ratio teeth form and characteristic Y-form cross section in the toothed portion.

FIG. 2 is a perspective view of a forged dual pinion rack having variable ratio tooth forms and characteristic Y-form cross sections in the toothed portions in accordance with a first embodiment of the invention.

FIG. 3 is an elevation of the forged dual pinion rack shown in FIG. 2.

FIG. 4 is a cross sectional view of the dual pinion rack on plane III–III in FIG. 3.

FIG. 5 is a cross section of the dual pinion rack on plane IV–IV in FIG. 3.

FIG. 6 shows the steering rack of FIG. 1 entering an induction heating coil box.

FIG. 7 shows a steering rack being heated in an induction heating coil box.

FIG. 8 shows a steering rack after being ejected from the induction heating coil box and striking an end-stop.

FIG. 9 shows the steering rack being gripped by a multi-axis robot.

MODE OF CARRYING OUT THE INVENTION

Figure 10:
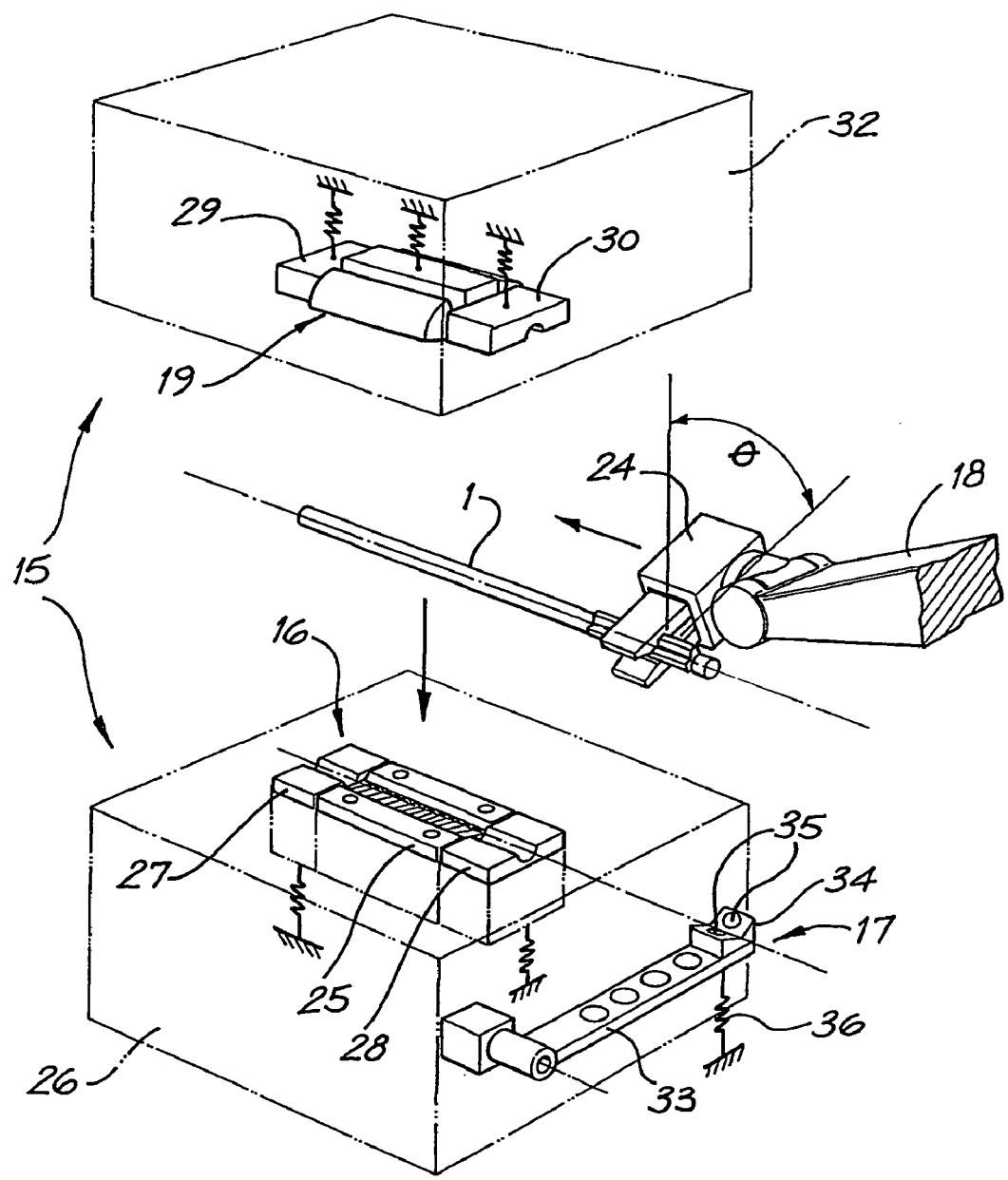
FIG. 10 shows the steering rack entering the forging die with correct angular orientation by a multi-axis robot.

FIG. 1 depicts a prior art steering rack 1 having variable ratio teeth 2 and Y-form cross section 3 in the toothed portion 37 of the type which may be forged in accordance with U.S. Pat. No. 5,862,701. The teeth 2 are forged near one end of a cylindrical bar, such that once forging has taken place, rack 1 has a long cylindrical section 4 and a short cylindrical section 5 disposed on either side of Y-form cross section 3.

FIGS. 2–5 show a first embodiment of a forged dual pinion rack 6 in accordance with the present invention. One end of rack 6 has a short cylindrical section 5 and first toothed portion 37 with variable ratio teeth 2 and a Y-form cross section 3, similar in configuration to that of the earlier described prior art rack 1. The other end of rack 6 has a short cylindrical section 12 and a second toothed portion 38 with variable ratio teeth 8 and Y-form cross section 10, and a central cylindrical section 13. The teeth 8 are oriented angularly about the longitudinal axis L at an angle of about 45° relative to the teeth 2.

In order to manufacture forged rack 6, a cylindrical bar is forged in accordance with U.S. Pat. No. 5,862,701 to form a configuration similar to rack 1, having a first toothed portion 37 with variable ratio teeth 2 and Y-form cross section 3, and long cylindrical section 4 and a short cylindrical section 5. Forged rack 1 is then cooled to room temperature and washed in a conventional manner. Teeth 2 and Y-form cross section 3 are then induction hardened and tempered in a conventional manner. Part of the cylindrical sections 4 and 5, may also optionally be induction hardened and tempered.

It may be necessary to straighten rack 1 by lateral bending in a known straightening machine, to ensure rack 1 is straight to within acceptable limits.

In order to forge the second toothed portion 38 with variable ratio teeth 8 and Y-form cross section 10 onto rack 1 to form dual pinion rack 6, the following steps are taken.

Firstly, rack 1 is placed in induction heating coil box 14 as shown in FIGS. 6 and 7, and a portion of cylindrical section 4 near its free end is induction heated. A roller conveyor and bar pusher mechanism (not shown) is used to support and movably urge rack bar 1 into induction heating coil box 14. The axial position of rack 1, may be determined by the travel of the not shown bar pusher mechanism and a not shown retaining means may hold rack 1 in position during heating.

Rack 1 is then removed from induction heating coil box 14 by some not shown means via the roller conveyor, and the end of cylindrical section 5 comes into contact with spring mounted end stop 21 as shown in FIG. 8. Spring 22 on end stop 21 cushions the impact of rack 1 to prevent rebounding on contact. Sensor 23 provides a signal to a multi-axis robot 18, to pick up heated rack 1 and transport it to die 15, as shown in FIGS. 9 and 10.

FIG. 9 shows multi-axis robot 18 with grip means 24 at the instant rack 1 is gripped. Preferably, grip means 24 is adapted to grip rack 1, using teeth 2 and Y-form cross section 3 of first toothed portion 37 as datums.

Figure 11:
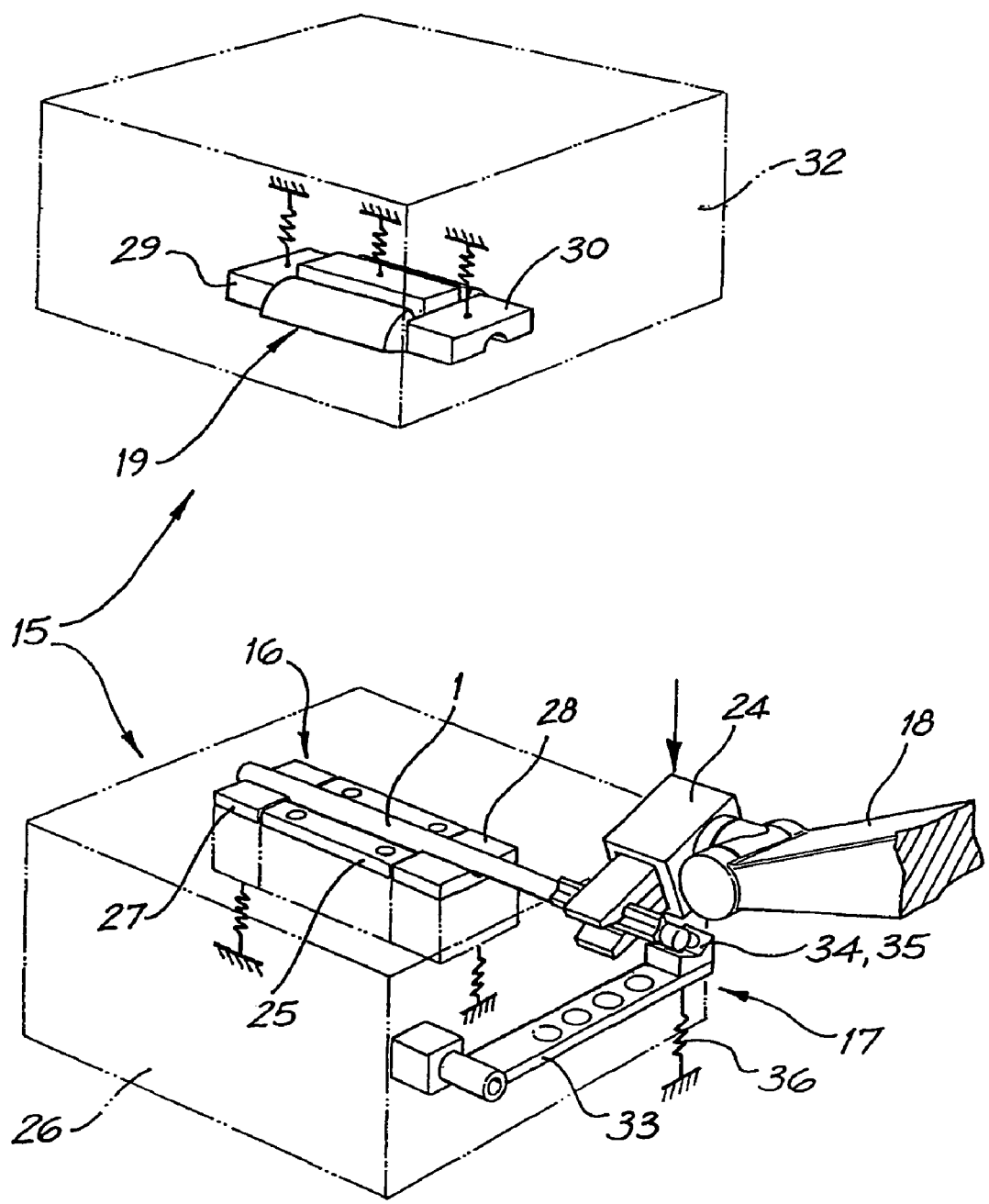
FIG. 11 shows the steering rack being loaded into the bottom tooling of the forging die with correct axial and angular orientation by a multi-axis robot, and first contact with the orientation maintaining device.

FIG. 10 shows rack 1 entering die 15. FIG. 11 shows rack bar 1 being lowered into the lower die tooling 16. The datums referred to earlier, allow grip means 24 to grasp first toothed portion 37 at a predetermined axial location. Grip means 24 is rotated through an angle to the vertical to take up a predetermined angular orientation required for placing rack 1 in the correct position to forge teeth 8 and Y-form cross section 10 of second toothed portion 38 angularly relative to the teeth 2.

Forging die 15 is similar to that described in U.S. Pat. No. 5,862,701, so the details of upper die tooling 19 and lower die tooling 16 will not be fully described here. However, to appreciate how dual pinion rack 6 may be forged in die 15, it is necessary to describe the actions of some of these elements.

In FIG. 10 toothed die 25 is fixed in lower bolster 26. Lower grippers 27 and 28 are resiliently mounted in lower bolster 26 such that they translate vertically down relative to toothed die 25 during the last stages of die closure, typically 10–12 mm depending on rack design. Upper grippers 29 and 30 are similarly resiliently mounted in upper bolster 31 such that they translate vertically up relative to upper bolster 32. Thus, when in the last stages of die closure typically 10–12 mm before bottom dead centre, the two sets of grippers 27,28 and 29,30 come into contact and clamp rack bar 1 firmly. As the die bottoms out, the clamping pressure exerted by grippers 27, 28, 29 and 30 substantially prevents axial migration of hot metal from the die cavity and ensures a much more uniform axial pressure in the die cavity than can be achieved with open die processes.

Initially when rack 1 is placed in forging die 15 an orientation maintaining device 17 is used to hold rack 1 in the earlier described predetermined axial location and angular orientation. Once forging of rack 1 commences, orientation maintaining device 17 is arranged to deflect downwards in the later stage of the forging stroke. Orientation maintaining device 17 is a hinged beam 33 with vee-block 34 that acts as a "cradle" for temporarily supporting and anchoring first toothed portion 37 of rack 1. Vee-block 34 has two or more permanent magnets 35 mounted flush with the surfaces of the vee-block top faces. The initial vertical position of orientation maintaining device 17 is set by adjustable stop 36, which includes a resilient member that allows orientation maintaining device 17 to deflect downwards along a circular path during the final stage of die closure. The initial position of vee-block 34 is set such that first toothed portion 37 is supported horizontally and contact with each of grippers 27, 28 and vee-block 34. This is to ensure first toothed portion 37 does not overbalance in grippers 27 and 28 if the centre of mass of rack bar 1 is outboard of gripper 28, and to ensure first toothed portion 37 is in firm contact with permanent magnets 35 prior to first toothed portion 37 being released by grip means 24 of multi-axis robot 18.

Orientation maintaining device 17 is hinged at one end, and to one side of the centre line of the lower die tooling. This is to allow clearance for grip means 24 which may take any angular position between −45° and +225°, measured from the vertical. In FIG. 10, the angle θ as shown would about 45°. With such angular clearance, all possible relative angular orientations of the first and second toothed portions can be achieved by the method herein described.

Figure 12:
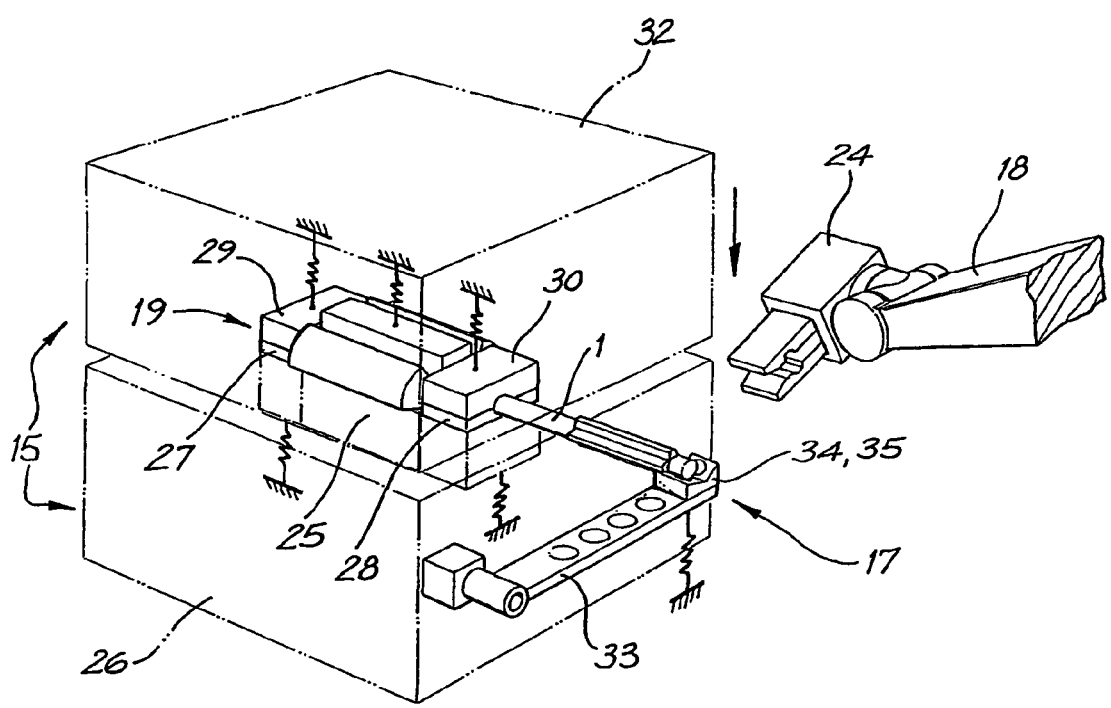
FIG. 12 shows the forging die in the closed position.

FIG. 12 shows die 15 at the instant of full die closure. Multi-axis robot 18 is clear of die 15, and orientation maintaining device 17 is fully deflected downward.

Figure 13:
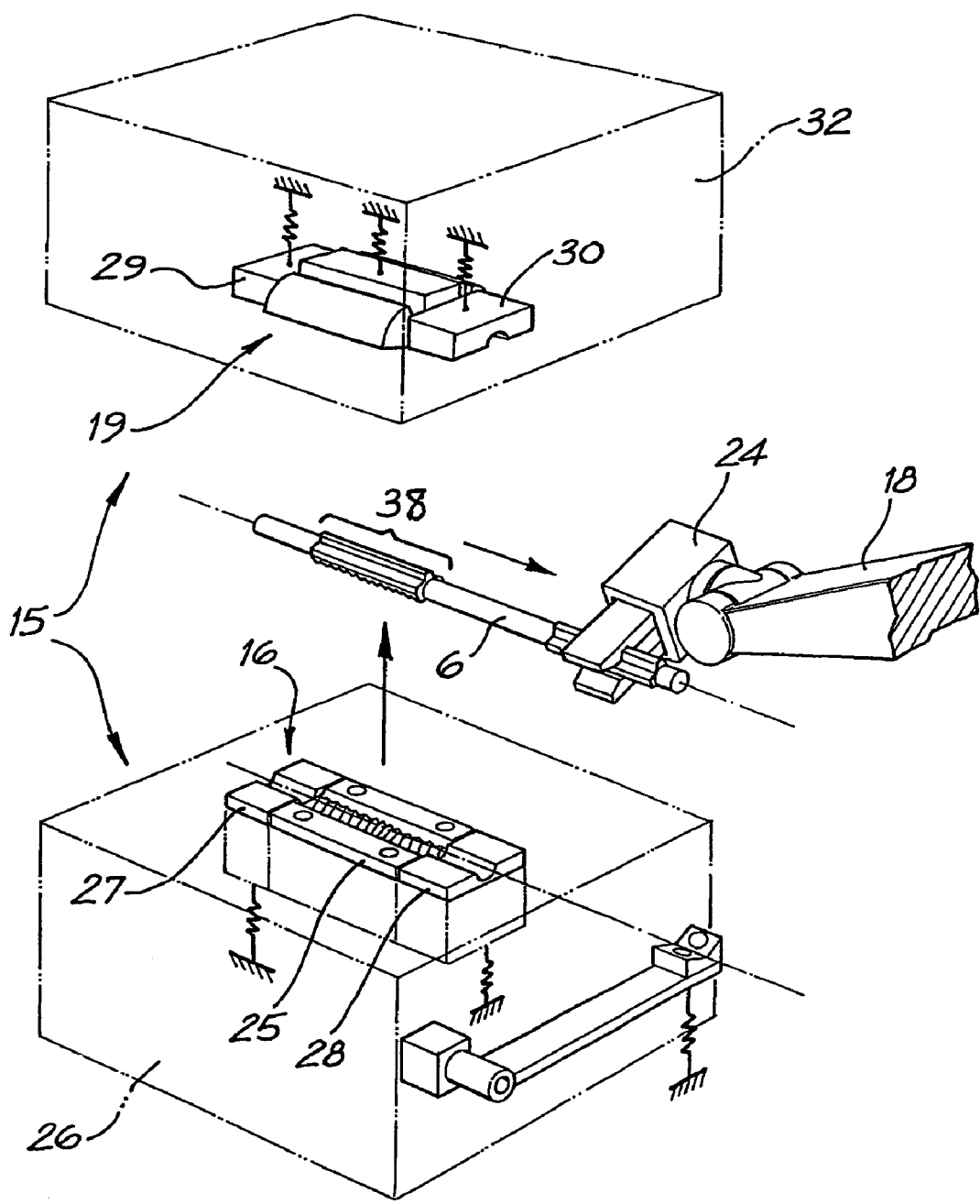
FIG. 13 shows the forged dual pinion steering rack being removed from the forging die by the multi-axis robot.

FIG. 13 shows forging die 15 in the open position after forging and forged dual pinion steering rack 6 being removed by multi-axis robot 18. Newly forged second toothed portion 38 of dual pinion rack 6 may then be transported to the appropriate station or stations for induction hardening and tempering in a conventional manner.

It may be necessary to straighten rack 6 by lateral bending in a straightening machine, to ensure rack 6 is straight to within acceptable limits.

Figure 14:
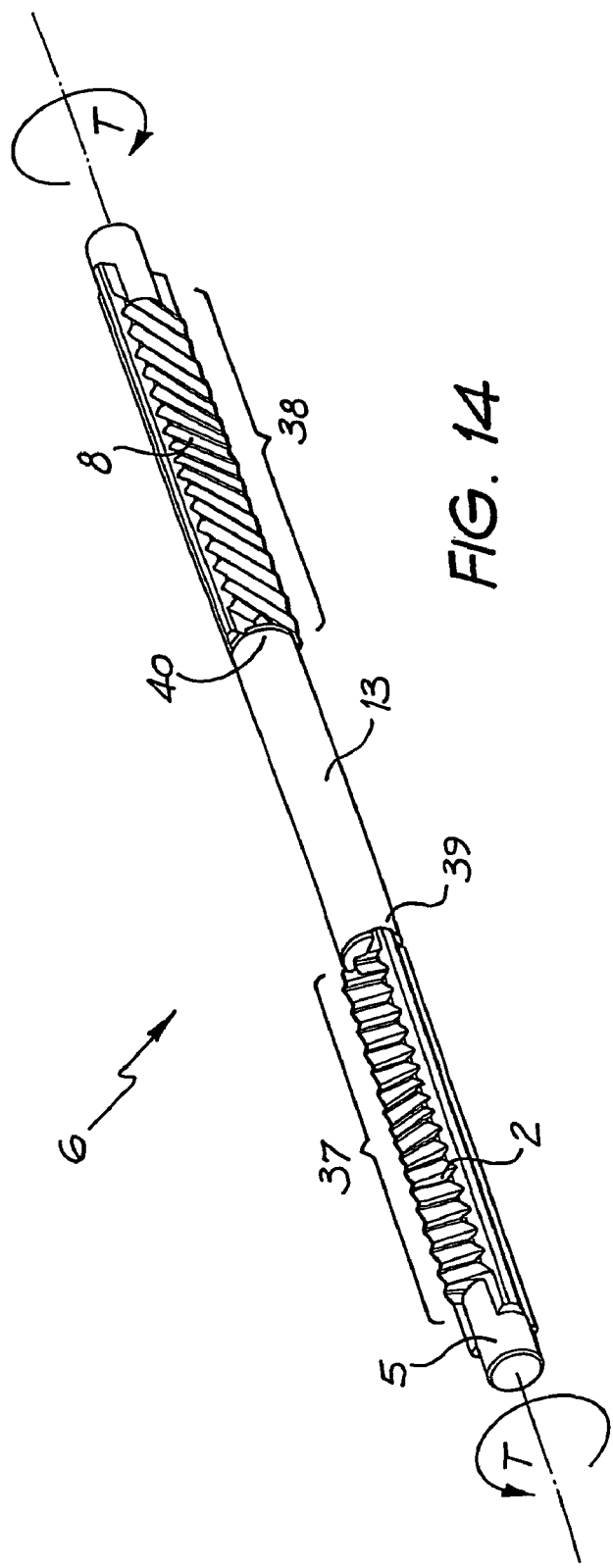
FIG. 14 shows a perspective view of the forged dual pinion rack of FIG. 2, showing equal arid opposite torques applied to the first and second toothed portions.
Figure 15:
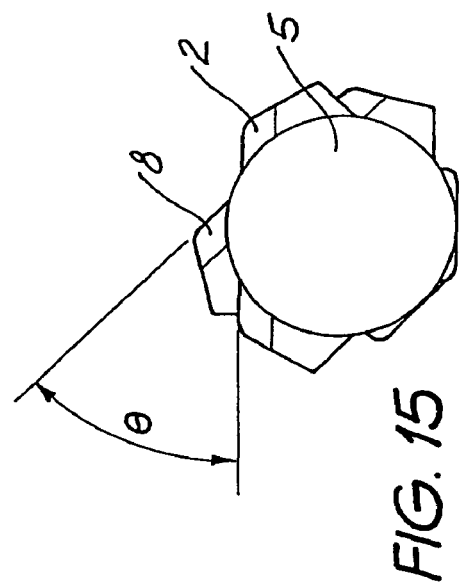
FIG. 15 shows an end elevation of the forged dual pinion rack showing angular orientation of the first and second toothed portions.

Preferably a final step may involve measuring the angular orientation (or alignment) θ of teeth 2 of the first toothed portion 37 relative to teeth 8 of the second tooth portion 38 as shown in FIG. 15, and if necessary angularly align 30 the toothed portions 37 and 38 of rack 6 to within acceptable tolerances of design by imparting torsional deformation to rack 6 in cylindrical section 13 between points 39 and 40 as shown in FIG. 14, by the application of equal and opposite torques T to first and second toothed portions 37 and 38.

It should be understood that in other not shown embodiments the various steps and components used may differ without departing from the spirit and scope of the invention. For instance, in one not shown embodiment, grip means 24 may align with a datum surface machined into the end of the rack at short cylindrical section 5 prior to heating of rack 1 (as described in FIGS. 6 and 7), rather than use teeth 2 and Y-form cross section 3 as datums. Also, in another not shown embodiment, grip means 24 may include a jaw member which has an obverse form to the teeth 2 or a roll pin which assist in establishing the datum.

Also, whilst the present embodiment depicts teeth 8 of second toothed portion 38 oriented angularly about the longitudinal axis L of rack 6 at an angle of about 45° relative to teeth 2 of first toothed portion 37, in another not shown embodiment the angular orientation of second toothed portion 37 may be oriented angularly about the longitudinal axis L of rack 6 at some other angle relative to teeth 2 of first toothed portion 37. Furthermore, in another not shown embodiment first and second toothed portions 37, 38 may lie in substantially the same or parallel planes.

In other not shown embodiments first and second forged toothed portions 37, 38 may have other than Y-form cross sections, and may be variable ratio or constant ratio.

In other not shown embodiments the apparatus described may be used to forge the second toothed portion onto rack 1, when the first toothed portion 37 has been machined into rack 1 rather than by forging.

The invention claimed is:

1. A method of manufacturing a steering rack bar by forging, said method comprising the steps of:
   (i) placing a heated cylindrical rack bar in a first forging die and forging a first toothed portion at one end thereof;
   (ii) removing said rack bar;
   (iii) heating said rack bar at or near the other end of said rack; and
   (iv) placing said other end of said rack bar in a second forging die and forging a second toothed portion wherein, prior to forging said second toothed portion, the rack bar is axially and angularly aligned to a predetermined axial location and angularly orientated utilising said first toothed portion or features at or near said one end of said rack bar as a datum, and placed and held in said predetermined axial location and angular orientation prior to forging of said second toothed portion.

2. A method as claimed in claim 1, wherein said first toothed portion is cooled, hardened and tempered after step (ii) and before step (iii).

3. A method as claimed in claim 1, wherein in a further step after step (iv), the angular orientation of said first toothed portion relative to said second toothed portion is measured.

4. A method as claimed in claim 1, wherein in a further step if said angular orientation of said first toothed portion relative to said second toothed portion is outside a predetermined tolerance, a torsional deformation is imparted to said rack such that said angular orientation of said first toothed portion relative to said second toothed portion is controlled within said predetermined tolerance.

5. A method as claimed in claim 1, wherein at least one of said first and second toothed portions has a Y-form cross-section.

6. A method as claimed in claim 1, wherein at least one of said first and second toothed portions has a variable ratio form.

7. A method as claimed in claim 1, wherein at least one of said first and second toothed portions has a constant ratio form.

8. A method as claimed in claim 1, wherein the teeth of said second toothed portion are oriented angularly about the longitudinal axis of the rack relative to the teeth of said first toothed portion.

9. An apparatus for forging a second toothed portion onto a steering rack bar having a first toothed portion at or near one end, said apparatus comprising, grip means for gripping said rack bar in a predetermined axial location and angular orientation utilising said first toothed portion or features at or near said one end as a datum, transportation means for transporting said gripped rack bar and placing the other end of said rack into a forging die, and orientation maintaining means to hold said rack bar in said predetermined axial location and angular orientation prior to said forging die forging said second toothed portion.

10. An apparatus as claimed in claim 9, wherein said grip means and said transportation means are both components of a multi-axis robot.

11. An apparatus as claimed in claim 9, wherein said orientation maintaining means comprises a magnetic cradle.

12. An apparatus as claimed in claim 11, wherein said magnetic cradle is resiliently mounted to the lower die tooling of said forging die.

* * * * *